United States Patent [19]

Nakahama et al.

[11] Patent Number: 5,242,971
[45] Date of Patent: Sep. 7, 1993

[54] ETHYLENE-PROPYLENE-DIENE RUBBER, ELASTOMER COMPOSITION AND VULCANIZED RUBBER THEREOF

[75] Inventors: Hidenari Nakahama; Takashi Mishima, both of Ichihara, Japan

[73] Assignee: Mitsui Petrochemical Industries, Ltd., Tokyo, Japan

[21] Appl. No.: 689,930

[22] PCT Filed: Oct. 5, 1990

[86] PCT No.: PCT/JP90/01292

§ 371 Date: Jun. 4, 1991

§ 102(e) Date: Jun. 4, 1991

[87] PCT Pub. No.: WO91/05011

PCT Pub. Date: Apr. 18, 1991

[30] Foreign Application Priority Data

Oct. 5, 1989 [JP] Japan .................................. 1-260665

[51] Int. Cl.⁵ .................. C08L 23/16; C08L 7/00; C08L 9/00; C08L 23/26
[52] U.S. Cl. .................. 524/526; 525/193; 525/194; 525/211; 525/237; 525/240; 525/315; 524/482; 524/491
[58] Field of Search ............ 525/211, 237, 240; 524/526

[56] References Cited

U.S. PATENT DOCUMENTS

| | | | |
|---|---|---|---|
| 3,817,952 | 6/1974 | Knabeschuh et al. | 525/331.7 |
| 3,884,993 | 5/1975 | Gros | 525/211 |
| 4,843,128 | 6/1989 | Ceasare | 525/237 |
| 4,882,387 | 11/1989 | Tobing | 525/237 |
| 4,960,829 | 10/1990 | Allen et al. | 525/237 |

FOREIGN PATENT DOCUMENTS 0227206 7/1987 European Pat. Off. .
0246745 11/1987 European Pat. Off. .
0264653 4/1988 European Pat. Off. .

*Primary Examiner*—Carman J. Seccuro, Jr.
*Attorney, Agent, or Firm*—Sherman and Shalloway

[57] ABSTRACT

The present invention provides ethylene-propylene-diene rubbers which are excellent in co-vulcanizability with conjugated diene rubbers and can impart excellent weather resistance, ozone resistance and thermal aging resistance without detriment to excellent mechanical characteristics, wear resistance and dynamic fatigue resistance which the conjugated diene rubbers possess.

The ethylene-propylene-diene rubbers of the present invention are characterized by having a Mooney viscosity $ML_{1+4}$ (100° C.) of 50 to 120 and comprising
  (A) 90 to 40% by weight of a high-molecular weight ethylene-propylene-diene copolymer rubber having an ethylene content of 73 to 85 mol %, an intrinsic viscosity $[\eta]$ of 2.5 to 5.0 dl/g as measured at 135° C. in decalin and an iodine value of 15 to 35, and
  (B) 10 to 60% by weight of a low-molecular-weight ethylene-propylene-diene copolymer rubber having an ethylene content of 73 to 85 mol %, an intrinsic viscosity $[\eta]$ of 0.15 to 0.8 dl/g as measured at 135° C. in decalin and an iodine value of 15 to 35.

Further, the present invention provides elastomer compositions comprising the ethylene-propylene-diene rubber as mentioned above, a conjugated diene rubber and an inorganic filler, and vulcanized rubbers obtained by co-vulcanizing said compositions.

The vulcanized rubbers are very useful for tires, automobile parts, general-purpose industrial components and civil engineering and building components, particularly materials which require dynamic fatigue resistance.

15 Claims, No Drawings

ETHYLENE-PROPYLENE-DIENE RUBBER, ELASTOMER COMPOSITION AND VULCANIZED RUBBER THEREOF

TECHNICAL FIELD

This invention relates to ethylene-propylene-diene rubbers, elastomer compositions and vulcanized rubbers thereof. More particularly, it relates to ethylene-propylene-diene rubbers which are excellent in co-vulcanizability with conjugated diene rubbers and are capable of imparting excellent weather resistance, ozone resistance and thermal aging resistance without deterioating the excellent mechanical characteristics, wear resistance and dynamic fatigue resistance which conjugated diene rubbers such as natural rubber (NR), styrene-butadiene rubber (SRR), isoprene rubber (IR) and butadiene rubber (BR) possess, elastomer compositions containing such ethylene-propylene-diene rubber as mentioned above and vulcanized rubbers composed of the elastomer compositions.

TECHNICAL BACKGROUND

Ethylene-propylene-diene rubbers (EPDM) are rubbers excellent in weather resistance, ozone resistance and thermal aging resistance and widely used for the static sections of automobile parts, such as weather stripping, door glass run channel, radiator hose, etc.

On the other hand, most of parts such as tires, rubber vibration insulators, etc. which require mechanical strength against dynamic fatigue are prepared by using conjugated diene rubbers such as NR, SBR and BR or blends thereof.

It is necessary to improve the thermal aging resistance and weather resistance of automobile parts to cope with the improved performance of automobiles in recent years.

However, though EPDM is excellent in weather resistance, ozone resistance and thermal aging resistance, dynamic fatigue resistance thereof is so poor that EPDM alone cannot be used for the preparation of tires and rubber vibration insulators.

Accordingly, there have been made many studies on the blends of EPDM and the conjugated diene rubber to utilize the advantageous characteristics of each of EPDM and conjugated diene rubber. However, EPDM-conjugated diene rubber blends excellent in co-vulcanizability could not be obtained and hence they could not be put to practical use.

Conventional techniques related to the blends of EPDM and conjugated diene rubber in the above studies are described in Journal of the Society of Rubber industry, Japan, 51,685 (1978) written by Yasuhiro Oda and Masashi Aoshima. As the blending techniques, there are disclosed (1) vulcanization with polysulfides, (2) vulcanization with peroxides, (3) application of prevulcanized EPDM, (4) application of prevulcanized EPDM having a high iodine value, (5) application of halogenated EPDM, (6) utilization of accelerators having a long-chain alkyl group, etc.

According to the disclosures of the aforesaid literature, EPDM having an intrinsic viscosity of at least 3.0 dl/g as measured in xylene at 70° C., a propylene content of not higher than 35% and a high iodine value is found to be good.

Though these descriptions are directed to improve the co-vulcanizability of EPDM with conjugated diene rubber, however, there is described nothing about the items of quality practically required for the quality of goods, particularly about dynamic strength. EPDM-conjugated diene rubber having excellent dynamic fatigue resistance could not be obtained by the above-described techniques.

The purpose of blending EPDM with conjugated diene rubber is to impart excellent thermal aging resistance and weather resistance to the resulting blends without reducing practically excellent crack growth resistance, dynamic fatigue resistance and wear resistance which conjugated diene rubbers possess. Accordingly, it is necessary that dynamic fatigue resistance is imparted to EPDM to be blended with conjugated diene rubbers.

As an example of requiring dynamic fatigue resistance most, there is described in Rubber Chemistry Technology, Vol. 44, page 1043 (October 1971) that the desired characteristics can be obtained by using EPDM having a high Mooney viscosity for All-EPDM as a rubber vibration insulator.

However, the use of high-molecular-weight EPDM is considered to be a matter which is easily conceived by those skilled in the art. The most essential point of research and development is to improve physical properties of the resulting blend without detriment to the processability of the blend. The processability of EPDM decreases when the molecular weight of EPDM increases. Any means for improving simultaneously both the processability and the dynamic fatigue resistance has not been disclosed as yet. A known technique to improve the processability of EPDM having a high Mooney viscosity is to extend EPDM with paraffinic or naphthenic extender oil. However, an elastomer composition containing an ethylene-propylene-diene rubber (EPDM) having excellent co-vulcanizability could not be obtained without deteriorating the excellent wear resistance and dynamic fatigue resistance which conjugated diene rubbers possess, by using merely the extender oil.

Accordingly, it has been demanded to provide ethylene-propylene-diene rubber, an elastomer composition containing said ethylene-propylene-diene rubber and vulcanized rubber composed of said elastomer composition, said ethylene-propylene-diene rubber being excellent in co-vulcanizability with conjugated diene rubbers and being capable of imparting excellent weather resistance, ozone resistance and thermal aging resistance without deteriorating the excellent mechanical characteristics, wear resistance and dynamic fatigue resistance which conjugated diene rubbers such as NR, IR, SBR and BR possess.

Japanese Patent Laid-Open Publn. No. 22551/1978 discloses a vulcanizable composition for a rubber vibration insulator having improved fatigue failure life comprising an ethylene-propylene rubber, which is obtained by adding 5 to 90 parts by weight of carbon black, 0.1 to 2 parts by weight of sulfur and a suitable amount of process oil to 100 parts by weight of oil-extended rubber composed of a mixture of a rubber with an extender oil, said rubber consisting of 10 to 50% by weight of an ethylene-propylene-ethylidene-norbornene terpolymer having an intrinsic viscosity $[\eta]$ of not higher than 1.0 as measured at 70° C. in xylene solution and 90 to 50% by weight of an ethylene-propylene-ethylidene-norbornene terpolymer having an intrinsic viscosity $[\eta]$ of not lower than 3.0 as measured in the same manner as that described above, and said extender oil contained and amount of 20 to 80 parts by weight, based on 100 parts by weight of the rubber.

The present invention is intended to solve such problems associated with the prior art as mentioned above and an object of the present invention is to provide ethylene-propylene-diene rubbers, elastomer compositions containing said ethylene-propylene-diene rubber and vulcanized rubbers comprising said elastomer compositions, said ethylene-propylene-diene rubbers being excellent in co-vulcanizability with conjugated diene rubbers and being capable of imparting excellent weather resistance, ozone resistance and thermal aging resistance without deteriorating the excellent mechanical characteristics, wear resistance and dynamic fatigue resistance which conjugated diene rubbers such as NR, IR, SBR and BR possess.

DISCLOSURE OF THE INVENTION

The ethylene-propylene-diene rubbers of the present invention are characterized by having a Mooney viscosity $ML_{1+4}$ (100° C.) of 50 to 120 and comprising (A) 90 to 40% by weight of a high-molecular-weight ethylene-propylene-diene copolymer rubber having an ethylene content of 73 to 85 mol %, an intrinsic viscosity $[\eta]$ of 2.5 to 5.0 dl/g as measured at 135° C. in decalin and an iodine value of 15 to 35, and (B) 10 to 60% by weight of a low-molecular-weight ethylene-propylene-diene copolymer rubber having an ethylene content of 73 to 85 mol %, an intrinsic viscosity $[\eta]$ of 0.15 to 0.8 dl/g as measured at 135° C. in decalin and an iodine value of 15 to 35.

The elastomer compositions of the present invention are characterized by containing

[I] an ethylene-propylene-diene rubber having a Mooney viscosity $ML_{1+4}$(100° C.) of 50 to 120 and comprising (A) 90 to 40% by weight of a high-molecular-weight ethylene-propylene-diene copolymer rubber having an ethylene content of 73 to 85 mol %, an intrinsic viscosity $[\eta]$ of 2.5 to 5.0 dl/g as measured at 135° C. in decalin and an iodine value of 15 to 35, and (B) 10 to 60% by weight of a low-molecular-weight ethylene-propylene-diene copolymer rubber having an ethylene content of 73 to 85 mol %, an intrinsic viscosity $[\eta]$ of 0.15 to 0.8 dl/g as measured at 135° C. in decalin and an iodine value of 15 to 35;

[II] a conjugated diene rubber; and

[III] an inorganic filler.

The vulcanized rubbers of the present invention are characterized in that they are obtained by co-vulcanizing the above-described elastomer compositions of the present invention.

BEST MODE FOR CARRYING OUT THE INVENTION

The ethylene-propylene-diene rubbers, the elastomer compositions and the vulcanized rubbers according to the present invention are concretely illustrated below.

The ethylene-propylene-diene rubbers of the present invention comprise a specific high-molecular-weight ethylene-propylene-diene copolymer rubber (A) and a specific low-molecular-weight ethylene-propylene-copolymer rubber (B). The elastomer compositions of the present invention comprise i said ethylene-propylene-diene rubber [I], a conjugated diene rubber [II] and an inorganic filler [III].

Ethylene-propylene-diene rubber [II]

The high-molecular-weight ethylene-propylene-diene copolymer rubbers (A) used in the present invention comprise ethylene, propylene and a non-conjugated diene.

Examples of the non-conjugated diene include concretely chain non-conjugated dienes such as 1,4-hexadiene and cyclic non-conjugated dienes such as ethylidenenorbornene (ENB), norbornadiene, methylnorbornene, dicyclopentadiene, 2-methylnorbornadiene and 5-vinyl-2-norbornene. Of these compounds, ENB is particularly preferable.

In the present invention, it is necessary to first adjust the vulcanization rate and vulcanization degree of the non-conjugated dienes to those of the conjugated diene rubbers to obtain the co-vulcanizability of the non-conjugated dienes with the conjugated diene rubbers such as NR and SBR. In this sense, ENB is most preferred as the non-conjugated diene used together with the high-molecular-weight ethylene-propylene-diene copolymer rubber.

The high-molecular-weight ethylene-propylene-diene copolymer rubbers (A) used in the present invention have an iodine value of 15 to 35, preferably 18 to 25, said iodine value being an index which indicates a non-conjugated diene content.

When the amount of the non-conjugated diene in EPDM is increased, crack growth resistance which is one of dynamic fatigue test items becomes extremely poor, though the curve of tensile strength has a tendency to approach a linear relationship, namely when tensile strength is apparently examined by the curve wherein the abscissa axis is the blend ratio of the conjugated diene rubber and EPDM. Such EPDM cannot be practically blended into rubber vibration insulators, treads for pneumatic tires and sidewalls for tires, these members being remarkably subjected to dynamic distortion and requiring mechanical strength.

The high-molecular-weight ethylene-propylene-diene copolymer rubbers (A) which are used in the present invention have an intrinsic viscosity $[\eta]$ of 2.5 to 5.0 dl/g, preferably 3.0 to 4.3 dl/g as measured at 135° C. in decalin and an ethylene content of 73 to 85 mol %, preferably 75 to 82 mol %.

There is reported in "Research of ethylene-propylene rubber" 1966 of the tenth Kokenkai Report that the kneading of EPDM with conjugated diene rubber is generally carried out at 150° C. or below, but since their SP values (solubility parameter) are different from each other, they are not mixed with each other on a molecule level under the above conditions and they are in the state of microscopically nonuniform dispersion. The present invention provides ethylene-propylene-diene rubbers which are very excellent in co-vulcanizability with the conjugated diene rubbers and exhibit sufficient mechanical strength for practical use even in the state of microscopically nonuniform dispersion. The present inventors have made studies to obtain ethylene-propylene-diene rubbers having excellent mechanical strength in an unvulcanized state in this sense, and found that when a specific amount of a high-molecular-weight ethylene-propylene-diene copolymer rubber having an intrinsic viscosity $[\eta]$ within the range defined above and an ethylene content within the range defined above is used, the desired ethylene-propylene-diene rubbers can be obtained.

The low-molecular-weight ethylene-propylene-diene copolymer rubbers (B) used in the present invention comprise ethylene, propylene and a non-conjugated diene. The non-conjugated dienes in the copolymer rubbers (B) are the same non-conjugated dienes as those used in the high-molecular-weight ethylene-propylene-diene copolymer rubbers (A). ENB is particularly preferable.

The iodine value of the low-molecular-weight ethylene-propylene-diene copolymer rubbers (B) used in the present invention is the same value as that of the high-molecular-weight ethylene-propylene-diene copolymer rubbers (A) and is in the range of 15 to 35, preferably 18 to 25.

In the present invention, with an increase in a difference in non-conjugated diene content, that is, iodine value between the high-molecular-weight ethylene-propylene-diene copolymer rubber (A) and the low-molecular-weight ethylene-propylene-diene copolymer rubber (B), vulcanization rate becomes nonuniform and consequently strength characteristics and sets such as compression set (CS) are apt to be adversely affected. Hence, it is preferred that the rubbers are so chosen that the iodine value of the low-molecular-weight ethylene-propylene-diene copolymer rubber (B) is equal to that of the high-molecular-weight ethylene-propylene-diene copolymer rubber (A).

The low-molecular-weight ethylene-propylene-diene copolymer rubbers (B) used in the present invention have an intrinsic viscosity $[\eta]$ of 0.15 to 0.8 dl/g, preferably 0.2 to 0.4 dl/g as measured at 135° C. in decalin and an ethylene content of 73 to 85 mol %, preferably 75 to 82 mol %.

When the intrinsic viscosity $[\eta]$ of the low-molecular weight ethylene-propylene-diene copolymer rubber is lower than 0.15 dl/g, the properties thereof become equal to those of paraffinic or naphthenic softeners and hence an effect of improving mechanical strength and fatigue life cannot be expected.

Blending Ratio

In the present invention, the high-molecular-weight ethylene-propylene-diene copolymer rubbers (A) are used in an amount of 90 to 40% by weight, preferably 85 to 60% by weight based on 100% by weight of the combined amount of the high-molecular-weight ethylene-propylene-diene copolymer rubber (A) and the low-molecular-weight ethylene-propylene-diene copolymer rubber (B). The low-molecular-weight ethylene-propylene-diene copolymer rubbers (B) are used in an amount of 10 to 60% by weight, preferably 15 to 40% by weight based on 100% by weight of the combined amount of the copolymer rubbers (A) and (B).

The ethylene-propylene-diene rubbers of the present invention comprising the high-molecular-weight ethylene-propylene-diene copolymer rubber (A) and the low-molecular-weight ethylene-propylene-diene copolymer rubber (B) have a Mooney viscosity $ML_{1+4}$ (100° C.) of 50 to 120, preferably 70 to 100.

The ethylene-propylene-diene rubbers having a Mooney viscosity $ML_{1+4}$ (100° C.) within the range described above have good kneadability in a Banbury mixer. When it is considered that when subsidiary materials such as carbon are thoroughly dispersed in the polymer, synthetic rubber can perform functions as rubber, it is not preferred that the ethylene-propylene-diene rubbers have a high Mooney viscosity, and excellent elastomer compositions can be obtained by using the ethylene-propylene-diene rubbers having a Mooney viscosity within the range described above.

In the course of accomplishing the present invention, it has been found that a large amount of a softener contained in the elastomer compositions exerts a bad effect on dynamic fatigue test results. When such stress as maintaining constant, elongation is intermittently applied to a softener containing elastomer composition, the softener plays a role of relaxing the stress and hence the use of the softener is effective, but crack formation is often found in the softener containing elastomer composition after constant load test, i.e., a test where nearly the same stress is applied to the elastomer composition as the stress loaded on practical dynamic use. With due regard to the above, the ethylene-propylene-diene rubbers of the present invention are specified to non-oil-extended rubbers and the amount of softeners for addition after oil-extention are used in an amount of less than 30 parts by weight based on 100 parts by weight of the combined amount of the rubber components, that is, the ethylene-propylene-diene rubber [I] and the conjugated diene rubber [II]. Further, it is expected from the above-description that the low-molecular-weight ethylene-propylene-diene copolymer rubber (B) for forming the ethylene-propylene-diene rubber [I] of the present invention physically enhances the blending effect with the conjugated diene rubbers by imparting the high fluidity to the elastomer composition and the ethylene-propylene-diene rubber and the conjugated diene rubber react to form crosslinking to each other, whereby the elastomer composition is expected to have effects of relaxing fatigue and of markedly improving dynamic fatigue resistance and wear resistance.

In order to ascertain the above effects, the present inventors made a dynamic viscoelasticity test (distortion factor: 10%, temperature 190° C., sample stand: parallel plate, frequency: $1.58 \times 10^{-2}$ rad/s to $5 \times 10^2$ rad/s) wherein the abscissa axis represents frequency, the ordinate axis represents complex shear modulus $G^*$, $\omega_2$ is a frequency corresponding to $G^* = 1E6$ and $\omega_1$ is a frequency corresponding to $G^* = 1E5$ and expressed the state of the processability and physical properties of EPDM by an index $\omega_r$ defined by $\omega_r = \omega_2/\omega_1$. The magnitudes of the index $\omega_r$ are variable in proportion to the number of the side chains of EPDM, mutual intertwisting ratio, the composition distribution and molecular weight distribution thereof. Hence, the states of processability and physical properties can be well expressed by using the index $\omega_r$. Among the ethylene-propylene-diene rubbers of the present invention, ethylene-propylene-diene rubbers having $\omega_r$ of 50 to 150 are particularly excellent in kneadability and co-vulcanizability with the conjugated diene rubbers. The ethylene-propylene-diene rubbers having $\omega_r$ within the range described above can be applied to dynamic uses, because they are excellent in kneadability and co-vulcanizability with the conjugated diene rubbers as well as in crack growth resistance and thermal aging resistance.

In the elastomer compositions of the present invention, the ethylene-propylene-diene rubbers [I] are used in an amount of 25 to 90 parts by weight, preferably 30 to 80 parts by weight based on 100 parts by weight of the combined amount of the rubber components, that is, the ethylene-propylene-diene rubber [I] and the conjugated diene rubber [II]. When the ethylene-propylene-diene rubbers [I] are used in an amount within the range defined above, there can be obtained elastomer compositions which are excellent in weather resistance and thermal aging resistance while retaining excellent mechanical characteristics which the conjugated diene rubbers [II] possess.

Conjugated Diene Rubber [II]

As the conjugated diene rubbers [II] for forming the elastomer compositions of the present invention, isoprene type rubbers are used, because they have the most well-balanced mechanical strength among the conjugated diene rubbers. Namely, either or both of natural rubber (NR) and isoprene rubber (IR) are used. The rubbers (II) are used in an amount of 10 to 75 parts by weight, preferably 20 to 70 parts by weight based on 100 parts by weight of the combined amount of the rubber components, that is, the ethylene-propylene-diene rubber [I] and the conjugated diene rubber [II]. When the isoprene type rubbers are used in an amount within the range described above, there can be obtained elastomer compositions which are excellent in mechanical strength and has a strength capable of withstanding practical use.

In the elastomer composition of the present invention, butadiene rubber (BR), styrene-butadiene rubber (SBR), acrylonitrile-butadiene rubber (NBR), chloroprene rubber (CR) can be used together with the isoprene rubbers. The isoprene rubbers can be used in an amount of 10 to less than 75 parts by weight, preferably 20 to 70 parts by weight based on 100 parts by weight of the combined amount of the rubber components, and the total amount of the isoprene type rubber and the conjugated diene rubbers other than the isoprene rubbers are not more than 75 parts by weight based on 100 parts by weight of the combined amount of the rubber components.

Inorganic Filler [III]

Concrete examples of inorganic fillers which can be used in the present invention include carbon black such as SRF, GPF, FEF, HAF, ISAF, SAF, FT and MT, fine silicic acid powder, precipitated calcium carbonate, heavy calcium carbonate, talc and clay. In the present invention, the inorganic filler component [III] may be used in an amount of 20 to 150 parts by weight, preferably 30 to 100 parts by weight, more preferably 40 to 80 parts by weight based on 100 parts by weight of the combined amount of the rubber components, that is, the ethylene-propylene-diene rubber [I] and the conjugated diene rubber [II]. When the inorganic filler component [III] is used in an amount within the range described above, there can be obtained elastomer compositions which are excellent in wear resistance and dynamic fatigue resistance.

Preparation of Vulcanized Rubber

Vulcanized rubbers can be obtained from the elastomer compositions of the present invention by a method described hereinafter, that is, preparing an unvulcanized rubber blend (elastomer composition), molding the rubber blend into a desired shape and then vulcanizing it as in usually conducting the vulcanization of general-purpose rubber.

In the preparation of the vulcanized rubbers of the present invention, the types and amounts of softeners to be blended, the types and amounts of compounds such as vulcanizing agents, vulcanization accelerators, vulcanization aids, etc. for forming vulcanization system and stages for preparing vulcanized rubber in addition to the above-described components [I], [II] and [III] are properly chosen according to the uses of vulcanized rubbers and the required properties thereof.

As the softeners, those generally used for rubber are used. Concretely, examples of the softeners include petroleum softeners such as process oil, lubricating oil, paraffin, liquid paraffin, petroleum asphalt and Vaseline; coal tar softeners such as coal tar and coal tar pitch; fatty oil softeners such as castor oil, linseed oil, colza oil and coconut oil; tall oil; factice; wax such as beeswax, carnauba wax and lanolin; fatty acids and salts thereof such as ricinoleic acid, palmitic acid, barium stearate, calcium stearate and zinc laurate; and synthetic high-molecular materials such as petroleum resin, atactic polypropylene and coumarone-indene resin. Among them, petroleum softeners are preferred with process oil being particularly preferred.

In the preparation of the vulcanized rubbers of the present invention, sulfur, following sulfur containing compounds or organic peroxides can be used as vulcanizing agents. The sulfur compounds include concretely, sulfur chloride, sulfur dichloride, morpholine disulfide, alkylphenol disulfides, tetramethylthiuram disulfide and selenium dimethyldithiocarbamate. Among them, sulfur is preferable.

Sulfur or the sulfur containing compounds can be used in an amount of 0.1 to 10 parts by weight, preferably 0.5 to 5 parts by weight based on 100 parts by weight of the combined amount of the ethylene-propylene-diene rubber [I] and the conjugated diene rubber [II].

The organic peroxides include concretely dicumyl peroxide, 2,5-dimethyl-2,5-di(t-butylperoxy)hexane, 2,5-dimethyl-2,5-di(benzoylperoxy)hexane, 2,5-dimethyl-2,5-di(t-butylperoxy)hexine-3, di-t-butyl peroxide, di-t-butylperoxy-3,3,5-trimethylcyclohexane and t-butyl hydroperoxide. Of these compounds, dicumyl peroxide, di-t-butyl peroxide and di-t-butylperoxy-3,3,5-trimethylcyclohexane are preferably used.

It is preferred that vulcanization accelerators are used together with sulfur or the sulfur containing compounds when sulfur or the sulfur containing compounds are used as the vulcanizing agents in the preparation of the vulcanized rubbers of the present invention. Concrete examples of the vulcanization accelerators include thiazole compounds such as N-cyclohexyl-2-benzthiazole-sulfenamide, N-oxydiethylene-2-benzthiazole-sulfenamide, N,N-diisopropyl-2-benzthiazolesulfenamide, 2-mercaptobenzthiazole, 2-(2,4-dinitrophenyl)mercaptobenzthiazole, 2-(2,6-diethyl-4-morpholinothio)benzthiazole and dibenzthiazyl disulfide; guanidine compounds such as diphenylguanidine, triphenylguanidine, di-o-tolylguanidine, o-tolylbiguanide and diphenylguanidine phthalate; aldehyde-amine or aldehyde-ammonia compounds such as acetaldehyde-aniline reaction product, butylaldehyde-aniline condensate, hexamethylene-tetramine and acetaldehyde-ammonia reaction product; imidazoline compounds such as 2-mercaptoimidazoline; thiourea compounds such as thiocarbanilide, diethylthiourea, dibutylthiourea, trimethylthiourea and di-o-tolylthiourea; thiuram compounds such as tetramethylthiuram monosulfide, tetramethylthiuram disulfide, tetraethylthiuram disulfide, tetrabutylthiuram disulfide and pentamethylenethiuram tetrasulfide; dithio acid salt compounds such as zinc dimethyldithiocarbamate, zinc diethyldithiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate and tellurium diethyldithiocarbamate; xanthate compounds such as zinc dibutylxanthate; and other compounds such as zinc flower.

The vulcanization accelerators may be used in an amount of 0.1 to 20 parts by weight, preferably 0.2 to 10 parts by weight based on 100 parts by weight of the combined amount of the ethylene-propylene-diene rubber [I] and the conjugated diene rubber [II].

It is preferred that valcanization aids are used together with vulcanizing agents when the organic peroxides are used as the vulcanizing agents in the preparation of the vulcanized rubbers of the present invention. The vulcanization aids include concretely sulfur, quinone dioxime compounds such as p-quinone dioxime, methacrylate compounds such as polyethylene glycol dimethacrylate, allyl compounds such as diallyl phthalate and triallyl cyanurate and other compounds such as maleimide compounds and divinylbenzene.

Unvulcanized rubber blends are prepared in the following manner. Namely, the above-described components [I], [II] and [III] and the softener are kneaded at a temperature of 80° to 170° C. for 3 to 10 minutes in a mixer such as Banbury mixer. The vulcanizing agent and optionally the vulcanization accelerator or the vulcanization aid are added thereto. The resulting mixture is kneaded at a roller temperature of 40° to 80° C. for 5 to 30 minutes by using rollers such as open rolls and the kneaded material is extruded to prepare a ribbon-form or sheet-form rubber blend.

The thus-prepared rubber blend is molded into a desired shape by means of extrusion, calendering rolls or press. The molded article simultaneously with molding or after molding is introduced into a vulcanizer and heated at a temperature of 150° to 270° C. for 1 to 30 minutes to obtain vulcanized rubber. In conducting such vulcanization, a mold may be used or not used. When the mold is not used, molding and vulcanizing stages are generally carried out in a continuous manner.

As heating means in unvulcanizing tank, there can be used hot air, glass bead-fluidized bed, UHF (ultrashort wave electromagnetic wave) and steam.

EFFECT OF THE INVENTION

The ethylene-propylene-diene rubbers of the present invention comprise a specific high-molecular-weight ethylene-propylene-diene copolymer rubber (A) and a specific low-molecular-weight ethylene-propylene-diene copolymer rubber (B) in a specific ratio and have a Mooney viscosity $ML_{1+4}$(100° C.) of 50 to 120 so that the rubbers of the present invention are excellent in co-vulcanizability with the conjugated diene rubbers and have an effect of imparting excellent weather resistance, ozone resistance and thermal aging resistance to the elastomer composition containing them without detriment to excellent mechanical characteristics, wear resistance and dynamic fatigue resistance which the conjugated diene rubbers such as natural rubber (NR), styrene-butadiene rubber (SBR), isoprene rubber (IR) and butadiene rubber (BR) possess.

Among the ethylene-propylene-diene rubbers of the present invention, ethylene-propylene-diene rubbers having $\omega_r$ within the range of 50 to 150 are particularly excellent in kneadability and co-vulcanizability with the conjugated diene rubbers as well as in crack growth resistance and thermal aging resistance so that they can be applied to dynamic uses.

The elastomer compositions of the present invention comprise an ethylene-propylene-diene rubber [I] having the above-described effects, a conjugated diene rubber [II] and an inorganic filler [III] so that the compositions are excellent in co-vulcanizability as well as in mechanical characteristics, wear resistance, dynamic fatigue resistance, weather resistance, ozone resistance and thermal aging resistance, and can provide vulcanized rubbers having the above-mentioned effects.

The vulcanized rubbers obtained from the elastomer compositions of the present invention have the effects as mentioned above so that they can be widely used for tires, automobile parts, general-purpose industrial components and civil engineering and building components. The vulcanized rubbers of the present invention are suitable for use in the fields of materials which require dynamic fatigue resistance in particular, such as tire treads, tire side walls, rubber vibration insulators, rubber rollers, belts, wiper blades and various packings.

The present invention is now illustrated by reference to the following examples which, however, are not to be construed as limiting the present invention in any way.

The evaluation tests of vulcanized sheets in Examples and Comparative Examples were carried out in accordance with the methods as described below.

(1) Degree of Co-Vulcanization

Degree of co-vulcanization was represented by the ratio of the tensile strength of the actual blend material to tensile strength obtained by arithmetically averaging the tensile strength of natural rubber (NR) alone and that of the ethylene-propylene-diene rubber (EPDM) alone at the blending ratio of them.

(2) Tensile Test

No. 3 type dumbbell specimens described in JIS K 6301 were punched out of vulcanized rubber sheets. The specimens were subjected to a tensile test under such conditions that the measuring temperatures were 25° C. and 80° C. and the pulling rate was 500 mm/min according to the method described in JIS K 6301, item 3. Tensile stress at break $T_B$ and tensile elongation at break $E_B$ were measured.

(3) Flex Crack Growth (Flex Test)

Flex crack growth was examined by using de Mattia type machine (number of revolutions: 300 rpm). The crack length of each of three samples was measured under such conditions that the measuring temperature was 40° C. and the number of flexing was 30,000. Evaluation was made by the mean value of crack lengths.

(4) Endurance Test (Monsanto Fatigue Test)

No. 3 type dumbbell specimens described in JIS K 6301 were punched out of vulcanized rubber sheets. Each of 20 specimens was fatigued by elongation under such conditions that the rate of elongation was 150%, the measuring temperature was 40° C. and the number of revolutions was 300 rpm. The mean value of the number of times at the time of the breaking of dumbbell specimens was referred to as an index of endurance.

(5) Heat Generation Test

Heat generation test was carried out by using a flexometer (Goodrich) under such conditions that the load applied was 15 lb and the stroke was 6.9 mm according to ASTM D 623. An increase in temperature (a change in temperature) $T_2 - T_1 = \Delta T$ was measured. The number of specimens subjected to the test was two. The temperature at which the experiment was initiated was 37° C..

(6) Test For Abrasion

Attrition-resistant test was carried out under such conditions that the load applied was 45N and the angle was 15° according to Acron attrition test method (British Standard 903 Part A 9 (1957)). Volume loss (ml) on attrition per 1,000 times by abrasive disc was measured. The number of specimens subjected to the measurement was two.

(7) Test On Ozone Resistance

The time elapsed until a crack was formed was measured under such conditions that ozone concentration was 50 ppm, the measuring temperature was 40° C. and the rate of elongation (static elongation) was 20%. The time elapsed until a crack formed was referred to as an index of ozone resistance to weather resistance.

EXAMPLE 1

In a 4.3 liter Banbury mixer (manufactured by Kobe Steel, Ltd.) were kneaded 80 parts by weight of an ethylene-propylene-diene rubber having a Mooney viscosity $ML_{1+4}$ (100° C.) of 90, composed of 70% by weight of a high-molecular-weight ethylene-propylene-5-ethylidene-2-norbornene copolymer rubber having an ethylene content of 78 mol %, an intrinsic viscosity $[\eta]$ of 3.5 dl/g as measured at 135° C. in decalin and an iodine value of 20.5 and 30% by weight of a low-molecular-weight ethylene-propylene-5-ethylidene-2-norbornene copolymer rubber having an ethylene content of 78 mol %, an intrinsic viscosity $[\eta]$ of 0.24 dl/g as measured at 135° C. in decalin and an iodine value of 20.5, 20 parts by weight of natural rubber (NR) [RSS No. 1], 1 part by weight of stearic acid, 5 parts by weight of zinc oxide, 60 parts by weight of HAF carbon (a product of Asahi Carbon KK) and 5 parts by weight of paraffinic oil (Diana Process Oil PW 380, a product of Idemitsu Kosan Co., Ltd.).

To the thus-obtained kneaded product, there were added 3 parts by weight of sulfur and 3 parts by weight of vulcanization accelerator (Nocceller CZ, a product of Ōuchi Shinko Kagaku Kogyo KK). The mixture was kneaded by using rollers, processed into a sheet and pressed at 150° C. for 30 minutes to obtain a vulcanized sheet of 2 mm in thickness. Then the degree of co-vulcanization of the vulcanized sheet was determined.

The result is shown in Table 1.

COMPARATIVE EXAMPLES 1–4

The procedure of Example 1 was repeated except that an ethylene-propylene-diene rubber listed in Table 1 was used in place of the ethylene-propylene-diene rubber used in Example 1 to obtain a vulcanized sheet The degree of co-vulcanization of the vulcanized sheet was determined.

The result is shown in Table 1.

COMPARATIVE EXAMPLE 5

The procedure of Example 1 was repeated except that an ethylene-propylene-diene rubber having an ethylene content of 78 mol %, an intrinsic viscosity $[\eta]$ of 3.5 dl/g as measured at 135° C. in decalin, an iodine value of 20.5 and a Mooney viscosity $ML_{1+4}$ (100° C.) of 170 was used in place of the ethylene-propylene-diene rubber used in Example 1 and the amount of paraffinic oil used was 50 parts by weight to obtain a vulcanized sheet. The degree of co-vulcanization of the vulcanized sheet was determined.

The result is shown in Table 1.

COMPARATIVE EXAMPLE 6

The procedure of Example 1 was repeated except that an ethylene-propylene-diene rubber composed of only a high-molecular-weight ethylene-propylene-5-ethylidene-2-norbornene copolymer rubber having an ethylene content of 78 mol %, an intrinsic viscosity $[\eta]$ of 2.6 dl/g as measured at 135° C. in decalin an iodine value of 20.5 and a Mooney viscosity $ML_{1+4}$ (100° C.) of 90 was used in place of the ethylene-propylene-diene rubber used in Example 1 and the amount of paraffinic oil used was 50 parts by weight to obtain a vulcanized sheet. The degree of co-vulcanization of the vulcanized sheet was determined.

The result is shown in Table 1.

TABLE 1

| | Ethylene-propylene-diene-rubber | | | | | | | | |
|---|---|---|---|---|---|---|---|---|---|
| | high-molecular-weight | | | low-molecular-weight | | | | | |
| | intrinsic viscosity $[\eta]$ (dl/g) | ethylene content (mol/%) | iodine value | intrinsic viscosity $[\eta]$ (dl/g) | ethylene content (mol/%) | iodine value | Mooney viscosity $ML_{1+4}$ (100° C.) | $\omega_r$ | Degree of co-vulcanization (%) |
| Ex. 1 | 3.5 | 78 | 20.5 | 0.24 | 78 | 20.5 | 90 | 80 | 95 |
| Comp. Ex. 1 | 2.5 | 60 | 10.5 | 0.24 | 60 | 10.5 | 40 | 60 | 52 |
| Comp. Ex. 2 | 3.5 | 79 | 10.5 | 0.24 | 79 | 10.5 | 90 | 80 | 82 |
| Comp. Ex. 3 | 4.0 | 78 | 10.5 | 0.24 | 78 | 10.5 | 140*1 | 100 | 78 |
| Comp. Ex. 4 | 2.5 | 61 | 20.5 | 0.24 | 61 | 20.5 | 40 | 60 | 68 |
| Comp. Ex. 5 | 3.5 | 79 | 20.5 | | | | 170*1 | at least 200 | 73 |
| Comp. Ex. 6 | 2.6 | 78 | 20.5 | | | | 90 | 40 | 51 |

Note:
high-molecular-weight E-P-ENB: high-molecular-weight ethylene-propylene-5-ethylidene-2-norbornene copolymer rubber
low-molecular-weight E-P-ENB: low-molecular-weight ethylene-propylene-5-ethylidene-2-norbornene copolymer rubber
*1 The values of $ML_{1+4}$ (100° C.) were determined from the measurement of $MS_{1+4}$ (121° C.).

It is apparent from Table 1 that the ethylene-propylene-diene rubber is excellent in co-vulcanizability with the conjugated diene rubber when the ethylene-propylene-diene rubber is composed of high-molecular-weight E-P-ENB and low-molecular-weight E-P-ENB and has a Mooney viscosity $ML_{1+4}$ (100° C.) of about 90 and a high non-conjugated diene content. The ethylene-propylene-diene rubber of Comparative Example 5 which does not contain a low-molecular-weight EPDM is inferior in co-vulcanizability with the conjugated diene rubber to the ethylene-propylene-diene rubber of Example 1.

EXAMPLE 2

The procedure of Example 1 was repeated except that the amount of the ethylene-propylene-diene rubber used was 50 parts by weight and the amount of natural rubber used was 50 parts by weight to obtain a vulcanized sheet of 2 mm in thickness. Tensile test, flex test, endurance test, heat generation test and attrition test were carried out.

The results are shown in Table 2.

EXAMPLE 3

The procedure of Example 1 was repeated except that an ethylene-propylene-diene rubber having a Mooney viscosity $ML_{1+4}$ (100° C.) of 90, composed of 70% by weight of a high-molecular-weight ethylene-propylene-5-ethylidene-2-norbornene copolymer rubber having an ethylene content of 78 mol %, an intrinsic viscosity $[\eta]$ of 3.5 dl/g as measured at 135° C. in decalin and an iodine value of 30.6 and 30% by weight of a low-molecular-weight ethylene-propylene-5-ethylidene-2-norbornene copolymer rubber having an ethylene content of 78 mol %, an intrinsic viscosity $[\eta]$ of 0.24 dl/g as measured at 135° C. in decalin and an iodine value of 30.6 was used in place of the ethylene-propylene-diene rubber used in Example 1, the amount of said ethylene-propylene-diene rubber used was 50 parts by weight and the amount of natural rubber used was 50 parts by weight to obtain a vulcanized sheet of 2 mm in thickness. Tensile test, flex test, endurance test, heat generation test and attrition test were carried out.

The results are shown in Table 2.

COMPARATIVE EXAMPLE 7

The procedure of Example 1 was repeated except that an ethylene-propylene-diene rubber having a Mooney viscosity $ML_{1+4}$ (100° C.) of 90, composed of 70% by weight of a high-molecular-weight ethylene-propylene-5-ethylidene-2-norbornene copolymer rubber having an ethylene content of 78 mol %, an intrinsic viscosity $[\eta]$ of 3.5 dl/g as measured at 135° C. in decalin and an iodine value of 37.5 and 30% by weight of a low-molecular-weight ethylene-propylene-5-ethylidene-2-norbornene copolymer rubber having an ethylene content of 78 mol %, an intrinsic viscosity $[\eta]$ of 0.24 dl/g as measured at 135° C. in decalin and an iodine value of 37.5 was used in place of the ethylene-propylene-diene rubber used in Example 1, the amount of said ethylene-propylene-diene rubber used was 50 parts by weight and the amount of natural rubber used was 50 parts by weight to obtain a vulcanized sheet of 2 mm in thickness. Tensile test, flex test, endurance test, heat generation test and attrition test were carried out.

The results are shown in Table 2.

COMPARATIVE EXAMPLE 8

The procedure of Example 1 was repeated except that a styrene-butadiene rubber (SBR) (trade name: Tafuden 1530, a product of Asahi Chemical Industry Co., Ltd.) was used in place of the ethylene-propylene-diene rubber used in Example 1, the amount of said styrene-butadiene rubber used was 30 parts by weight, the amount of natural rubber used was 70 parts by weight, 30 parts by weight of FEF-HS carbon (60HG, a product of Asahi Carbon KK) was used in place of 60 parts by weight of HAF carbon, the amount of paraffinic oil used was 10 parts by weight, the amount of sulfur used was 0.5 parts by weight, the amount of vulcanization accelerator (NOCCELER CZ) used was 2.0 parts by weight and further 2.5 parts by weight of vulcanization accelerator (NOCCELER TT, a product of Ouchi Shinko Kagaku Kogyo KK) was used to obtain a vulcanized sheet of 2 mm in thickness. Tensile test, flex test, endurance test, heat generation test and attrition test were carried out.

The results are shown in Table 2.

TABLE 2

|  | Ex. 2 | Ex. 3 | Comp. Ex. 7 | Comp. Ex. 8 |
| --- | --- | --- | --- | --- |
| Blending ratio of EPDM to conjugated diene rubber | EPDM/NR = 5:5 | EPDM/NR = 5:5 | EPDM/NR = 5:5 | SBR/NR = 3:7 |
| Iodine value of high-molecular-weight and low-molecular-weight E-P-ENB | 20.5 | 30.6 | 37.5 |  |
| Measuring temp. 25° C. | | | | |
| $T_B$ [kg/cm²] | 185 | 186 | 190 | 204 |
| $E_B$ [%] | 480 | 470 | 470 | 630 |
| Measuring temp. 80° C. | | | | |
| $T_B$ [kg/cm²] | 78 | 85 | 80 | 68 |
| $E_B$ [%] | 230 | 210 | 190 | 240 |
| Flex test crack length after 30,000 flexings [mm] | 12 | 14 | 24 | 10 |
| Attrition test (Acron attrition test) [ml/1000 times] | 0.45 | 0.49 | 0.75 | 0.31 |
| Endurance test [times] | 80,000 | 75,000 | 60,000 | 45,000 |
| Heat generation test Raised temp. [°C.] | 29 | 30 | 33 | 26 |

Note:
EPDM: ethylene-propylene-diene rubber (high-molecular-weight E-P-ENB + low-molecular-weight E-P-ENB)
High-molecular-weight and low-molecular-weight E-P-ENB: high-molecular-weight and low-molecular-weight ethylene-propylene-5-ethyliene-2-norbornene copolymer rubbers
ωr of EPDM: 80

It is apparent from Table 2 that EPDM having an iodine value of higher than 35 cannot be used as materials for rubber vibration insulator, tread for pneumatic tire and side wall, because when the iodine value of the high-molecular-weight and low-molecular-weight E-P-ENB exceeds 35, crack growth resistance is rapidly deteriorated.

Further, it is apparent that vulcanized rubbers excellent in co-vulcanizability as well as in dynamic fatigue resistance can be obtained by using EPDM of Examples 2 and 3.

EXAMPLE 4

The procedure of Example 1 was repeated except that FEF-HS (60HG, a product of Asahi Carbon KK) was used in place of HAF carbon, the amount of the ethylene-propylene-diene rubber used was 30 parts by weight and the amount of natural rubber used was 70 parts by weight to obtain a vulcanized sheet of 2 mm in thickness. Tensile test and endurance test were carried out.

The results are shown in Table 3.

COMPARATIVE EXAMPLE 9

The procedure of Example 1 was repeated except that an ethylene-propylene-diene rubber having a Mooney viscosity $ML_{1+4}$ (100° C.) of 40 composed of 48% by weight of a high-molecular-weight ethylene-propylene-5-ethylidene-2-norbornene copolymer rubber having an ethylene content of 79 mol % an intrinsic viscosity $[\eta]$ of 3.5 dl/g as measured at 135° C. in decalin and an iodine value of 21 and 52% by weight of a low-molecular-weight ethylene-propylene-5-ethylidene-2-norbornene copolymer rubber having an ethylene content of 79 mol %, an intrinsic viscosity $[\eta]$ of 0.24 dl/g as measured at 135° C. in decalin and an iodine value of 21 was used in place of the ethylene-propylene-diene rubber used in Example 1, FEF-HS (60HG, a product of Asahi Carbon KK) was used in place of HAF carbon, the amount of said ethylene-propylene-diene rubber used was 30 parts by weight and the amount of natural rubber used was 70 parts by weight to obtain a vulcanized sheet of 2 mm in thickness. A tensile test and endurance test were carried out.

The results are shown in Table 3.

COMPARATIVE EXAMPLE 10

The procedure of Example 1 was repeated except that an ethylene-propylene-diene rubber having a Mooney viscosity $ML_{1+4}$ (100° C.) of 150, composed of 80% by weight of a high-molecular-weight ethylene-propylene-5-ethylidene-2-norbornene copolymer rubber having an ethylene content of 79 mol %, an intrinsic viscosity $[\eta]$ of 4.5 dl/g as measured at 135° C. in decalin and 20% by weight of a low-molecular-weight ethylene-propylene-5-ethylidene-2-norbornene copolymer rubber having an ethylene content of 79 mol %, an intrinsic viscosity $[\eta]$ of 0.18 dl/g as measured at 135° C. in decalin and an iodine value of 21 was used in place of the ethylene-propylene-diene rubber used in Example 1, FEF-HS (60HG, a product of Asahi Carbon KK) was used in place of HAF carbon, the amount of said ethylene-propylene-diene rubber used was 30 parts by weight and the amount of natural rubber used was 70 parts by weight to obtain a vulcanized sheet of 2 mm in thickness. Tensile test and endurance test were carried out.

The results are shown in Table 3.

COMPARATIVE EXAMPLE 11

The procedure of Example 1 was repeated except that EPDM 5875 (a product of Polysar Company) containing 100 phr of oil blended therewith was used in place of the ethylene-propylene-diene rubber used in Example 1, FEF-HS carbon (60HG, a product of Asahi Carbon KK) was used in place of HAF carbon, the amount of said EPDM used was 30 parts by weight and the amount of natural rubber used was 70 parts by weight to obtain a vulcanized sheet of 2 mm in thickness. Tensile test and endurance test were carried out.

The results are shown in Table 3.

TABLE 3

|  | Comp. Ex. 9 | Ex. 4 | Comp. Ex. 10 | Comp. Ex. 11 |
| --- | --- | --- | --- | --- |
| High-molecular-weight E-P-ENB | | | | |
| Intrinsic viscosity $[\eta]$ (dl/g) | 3.5 | 3.5 | 4.5 | |
| Amount blended [phr] | 48 | 70 | 80 | |
| Low-molecular-weight E-P-ENB | | | | |
| Intrinsic viscosity $[\eta]$ (dl/g) | 0.24 | 0.24 | 0.18 | |
| Amount blended [phr] | 52 | 30 | 20 | |
| EPDM Mooney viscosity $ML_{1+4}$ (100° C.) | 40 | 90 | 150 | 60 |
| Amount of oil extender [phr] | | | | 100 |
| Measuring temperature 25° C. | | | | |
| $T_B$ [kg/cm$^2$] | 160 | 210 | 175 | 180 |
| $E_B$ [%] | 630 | 680 | 520 | 520 |
| Endurance test (Monsanto fatigue test) (Times) | 300,000 | 800,000 | 100,000 | 100,000 |

Note:
High-molecular-weight E-P-ENB: high-molecular-weight ethylene-propylene-5-ethylidene-2-norbornene copolymer rubber
Low-molecular-weight E-P-ENB: low-molecular-weight ethylene-propylene-5-ethylidene-2-norbornene copolymer rubber
EPDM: ethylene-propylene-diene-rubber (high-molecular-weight E-P-ENB + low-molecular-weight E-P-ENB)

It is apparent from Table 3 that when EPDM has a Mooney viscosity $ML_{1+4}$ (100° C.) of higher than 120, kneadability is deteriorated, carbon is poorly dispersed and hence endurance is inferior.

Further, it is clear that EPDM 5875 (a product of Polysar Company) containing 100 phr of oil in Comparative Example 11 has poor co-vulcanizability with the conjugated diene rubber and does not have a relaxing effect on dynamic force and hence fatigue resistance is poor.

COMPARATIVE EXAMPLES 12 to 14

The procedure of Example 1 was repeated except that the amounts of the ethylene-propylene-diene rubber (EPDM) and natural rubber (NR) [RSS No. 1] blended were changed to those indicated in Table 4 to obtain vulcanized sheets of 2 mm in thickness. The vulcanized sheets were subjected to a test on ozone resistance.

The results are shown in Table 4.

EXAMPLES 5 to 7

The procedure of Example 1 was repeated except that the amounts of the ethylene-propylene-diene rubber (EPDM) and natural rubber (NR) [RSS No. 1] blended were changed to those indicated in Table 4 to obtain vulcanized sheets of 2 mm in thickness. The vulcanized sheets were subjected to a test on ozone resistance.

The results are shown in Table 4.

TABLE 4

|  | Comp. Ex. 12 | Comp. Ex. 13 | Comp. Ex. 14 | Ex. 5 | Ex. 6 | Ex. 7 |
| --- | --- | --- | --- | --- | --- | --- |
| Amount blended [phr] | | | | | | |
| EPDM | 0 | 10 | 20 | 30 | 40 | 50 |
| NR | 100 | 90 | 80 | 70 | 60 | 50 |
| Time elapsed till crack was formed [hours] | 20 | 24 | 27 | no cracking after 168 hours | no cracking after 168 hours | no cracking after 168 hours |

Note:
EPDM: ethylene-propylene-diene rubber of Example 1
NR: natural rubber RSS No. 1

It is apparent from Table 4 that when the amount of the ethylene-propylene-diene rubber (EPDM) is in the range of 20 to 30 parts by weight, ozone resistance is greatly improved, this trend influences not so much the quality of EPDM and EPDM should be used in an amount of at least 25 parts by weight per 100 parts by weight of the rubber components to impart weather resistance and ozone resistance to the elastomer compositions as the blends thereof with the conjugated diene rubbers.

What is claimed is:

1. An ethylene-propylene-diene rubber characterized by having a Mooney viscosity $ML_{1+4}$ (100° C.) of 50 to 120 and consisting essentially of
   (A) 90 to 40% by weight of a high-molecular weight ethylene-propylene-diene copolymer rubber having an ethylene content of 73 to 85 mol %, an intrinsic viscosity $[\eta]$ of 2.5 to 5.0 dl/g as measured at 135° C. in decalin and an iodine value of 15 to 35, and
   (B) 10 to 60% by weight of a low-molecular-weight ethylene-propylene-diene copolymer rubber having an ethylene content of 73 to 85 mol %, an intrinsic viscosity $[\eta]$ of 0.15 to 0.8 dl/g as measured at 135° C. in decalin and an iodine value of 15 to 35.

2. The ethylene-propylene-diene rubber as claimed in claim 1, wherein said ethylene-propylene-diene rubber has physical properties expressed by $\omega_r = (\omega_2/\omega_1)$ having a value of 50 to 150 in which $\omega_1$ is a frequency corresponding to $G^* = 1E5$ and $\omega_2$ is a frequency corresponding to $G^* = 1E6$.

3. An elastomer composition characterized by containing
   an ethylene-propylene-diene rubber having a Mooney viscosity $ML_{1+4}$ (100° C.) of 50 to 120 and consisting essentially of
   (A) 90 to 40% by weight of a high-molecular weight ethylene-propylene-diene copolymer rubber having an ethylene content of 73 to 85 mol %, an intrinsic viscosity $[\eta]$ of 2.5 to 5.0 dl/g as measured at 135° C. in decalin and an iodine value of 15 to 35, and
   (B) 10 to 60% by weight of a low-molecular-weight ethylene-propylene-diene copolymer rubber having an ethylene content of 73 to 85 mol %, an intrinsic viscosity $[\eta]$ of 0.15 to 0.8 dl/g as measured at 135° C. in decalin and an iodine value of 15 to 35;
   a conjugated diene rubber; and
   an inorganic filler.

4. The elastomer composition as claimed in claim 3, wherein the content of said ethylene-propylene-diene rubber is 25 to 90 parts by weight and the content of said conjugated diene rubber 75 to 10 parts by weight (the combined amount of said and being 100 parts by weight) and the content of said inorganic filler is 20 to 150 parts by weight based on 100 parts by weight of the combined amount of the ethylene-propylene-diene rubber and said conjugated diene rubber.

5. The elastomer composition as claimed in claim 3 or 4, wherein said conjugated diene is isoprene rubber.

6. The elastomer composition as claimed in any one of claims 3 to 5, 9 and 10 wherein said composition contains less than 30 parts by weight of a softener based on 100 parts by weight of the combined amount of the ethylene-propylene-diene rubber and the conjugated diene rubber.

7. The elastomer composition as claimed in any one of claims 3, 4, 5, or 6, wherein said ethylene-propylene-diene rubber has physical properties expressed by $\omega_r = (\omega_2/\omega_1)$ having a value of 50 to 150 to which $\omega_1$ is a frequency corresponding to $G^* = 1E5$, and $\omega_2$ is a frequency corresponding to $G^* = 1E6$.

8. A vulcanized rubber obtained by co-vulcanizing an elastomer composition containing
   an ethylene-propylene-diene rubber having a Mooney viscosity $ML_{1+4}$ (100° C.) of 50 to 120 and consisting essentially of
   (A) 90 to 40% by weight of a high-molecular weight ethylene-propylene-diene copolymer rubber having an ethylene content of 73 to 85 mol %, an intrinsic viscosity $[\eta]$ of 2.5 to 5.0 dl/g as measured at 135° C. in decalin and an iodine value of 15 to 35, and
   (B) 10 to 60% by weight of a low-molecular-weight ethylene-propylene-diene copolymer rubber having an ethylene content of 73 to 85 mol %, an intrinsic viscosity $[\eta]$ of 0.15 to 0.8 dl/g as measured at 135° C. in decalin and an iodine value of 15 to 35;
   a conjugated diene rubber; and
   an inorganic filler.

9. The elastomer composition as claimed in claim 4, wherein the content of said conjugated diene rubber (II) is less than 70 parts by weight and the combined amount of said (I) and (II) is 100 parts by weight.

10. The elastomer composition as claimed in claim 3 or 4, wherein said conjugated diene rubber (II) is natural rubber.

11. The vulcanized rubber as claimed in claim 8, wherein said rubber consists essentially of said ethylene-propylene-diene rubber (I) in an amount of 25 to 90 parts by weight and the said conjugated diene rubber (II) in an amount of 75 to 10 parts by weight, wherein the combined amount of said (I) and (II) is 100 parts by weight and said inorganic filler in an amount of 20 to 150 parts by weight based on 100 parts by weight of the combined amount of the ethylene-propylene-diene rubber (I) and said conjugated diene rubber (II).

12. The vulcanized rubber as claimed in claim 11, wherein the content of said conjugated diene rubber (II) is less than 70 parts by weight and the combined amount of said (I) and (II) is 100 parts by weight.

13. The vulcanized rubber as claimed in claim 8 or 11, wherein said conjugated diene rubber (II) is isoprene rubber.

14. The vulcanized rubber as claimed in claim 8 or 11, wherein said conjugated diene rubber (II) is natural rubber.

15. The vulcanized rubber as claimed in any one of claims 8, 11-14, wherein said composition contains less than 30 parts by weight of a softener based on 100 parts by weight of the combined amount of the ethylene-propylene rubber (I) and the conjugated diene rubber (II).

* * * * *